July 27, 1965    F. FORRAT    3,197,276
PROCESS FOR THE PREPARATION OF PURE ANHYDROUS
$AlF_3$ FROM $NH_4Al(SO_4)_2 \cdot 12 H_2O$
Filed July 9, 1963    2 Sheets-Sheet 1

INVENTOR
FRANCIS FORRAT
By: Paul M. Craig, Jr.
ATTORNEY

United States Patent Office 3,197,276
Patented July 27, 1965

3,197,276
PROCESS FOR THE PREPARATION OF PURE ANHYDROUS $AlF_3$ FROM $NH_4Al(SO_4)_2 \cdot 12H_2O$
Francis Forrat, Marcoussis, France, assignor to Compagnie Generale d'Electricite, Paris, France
Filed July 9, 1963, Ser. No. 293,796
Claims priority, application France, July 19, 1962, 904,540
8 Claims. (Cl. 23—88)

This invention concerns a process for the preparation of aluminum fluoride.

It is common knowledge that pure aluminum fluoride is prepared by sublimating impure aluminum fluoride which may have been obtained by conventional methods; that is to say, by the action of hydrofluoric acid on calcinated alumina.

The product obtained always retains a little oxygen and metals of the first transition group as impurities.

The present invention enables the separation of a pure product, which is free of oxygen and which contains less than 100 parts per million of transition metal ions.

It has as its object a process for the preparation of pure anhydrous aluminum fluoride characterized by thermally decomposing under vacuum the double anhydrous aluminum and ammonium fluoride obtained by the reaction of a solution of hydrofluoric acid with pure commercial ammonium aluminum sulfate.

The process starts with ammonium aluminum sulfate, $NH_4Al(SO_4)_2 \cdot 12H_2O$, which has been re-crystallized several times until it contains a proportion of iron which is less than $5 \times 10^{-6}$ or 5 parts per million; this is decomposed by a 48–50% solution by weight of hydrofluoric acid containing a proportion of (Fe+Ni+Cu) which is less than $10^{-6}$ or one part per million. The following reaction ensues:

$$3NH_4Al(SO_4)_2 \cdot 12H_2O + 6HF \rightarrow AlF_3 \cdot 3NH_4F + Al(SO_4)_3 + 3H_2SO_4 + 36H_2O$$

Reaction takes place at ambient temperature in a polyethylene receptacle; the double aluminum and ammonium fluoride is filtered, washed and dried; this fluoride is then thermally decomposed under vacuum by heating progressively up to 650° C.

Figure 1:
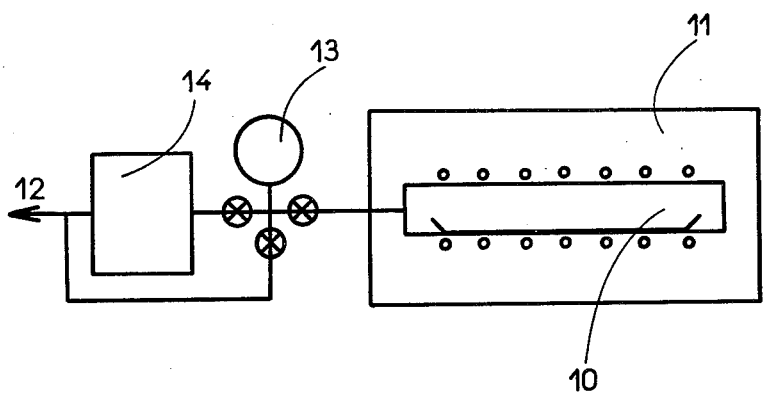

The latter operation can be effected with the apparatus shown in the schematic diagram in FIGURE 1 of the attached drawing.

As shown, a cup 10 containing the double anhydrous fluoride $AlF_3 \cdot 3NH_4F$ is put into an electric oven 11, which can heat up to 1000° C.; the atmosphere of this oven is linked to a high discharge vacuum pump 12 until a vacuum of $5 \times 10^{-2}$ mm. of mercury is obtained; 13 is a vacuum gauge and 14 a liquid air condenser. The gauge is mounted on a two way cock.

The theoretical yield of the process is ⅓ and approaches practically 90%, that is to say, one kilogram of ammonium aluminum sulfate affords about 60 grams of anhydrous fluoride $AlF_3$.

The aluminum fluoride obtained is very well crystallized and the average dimensions of its grains are of the order of 0.1μ.

Figure 2:
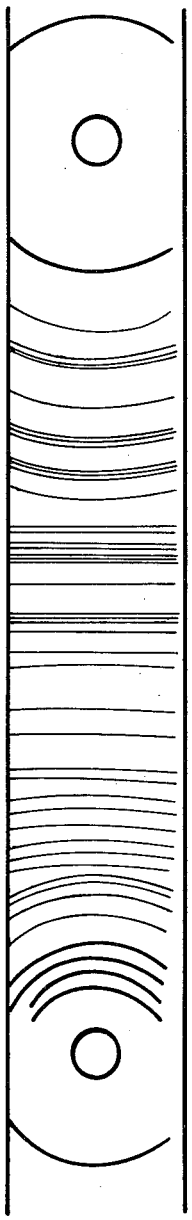

The crystalline texture of the obtained aluminum fluoride measured on the X-ray diffraction diagram at $\lambda K_\alpha Cu$ radiation shown on FIGURE 2 of the attached drawing is $a = 4.931$ A.
$c = 12.455$ A.

Homogeneous doping of the aluminum fluoride with transition metal ions, $Fe^{3+}$, for example, may be effected by mixing ferric sulfate with the original ammonium aluminum sulfate.

I claim:

1. A process for the preparation of pure anhydrous aluminum fluoride from the double aluminum and ammonium fluoride compound, $AlF_3 \cdot 3NH_4F$, which comprises reacting ammonium aluminum sulfate, $$NH_4Al(SO_4)_2 \cdot 12H_2O$$

with hydrofluoric acid to form said double fluoride compound, thermally decomposing said double fluoride compound under vacuum, and separating the obtained anhydrous aluminum fluoride.

2. A process according to claim 1, in which the ammonium aluminum sulfate used has been purified by successive recrystallizations until the proportion of iron contains is less than 5 parts per million.

3. A process according to claim 1, in which the hydrofluoric acid is used as a solution of 48–50% by weight and includes a proportion of iron+nickel+copper, the sum total of which is less than 1 part per million.

4. A process according to claim 1, in which the double fluoride compound is separated from the reaction mixture prior to thermal decomposition.

5. A process according to claim 4, in which the separation is effected by filtering, washing, and drying the double fluoride compound.

6. A process according to claim 1, in which the thermal decomposition takes place under vacuum at about 650° C.

7. A process according to claim 1, in which the ammonium aluminum sulfate is mixed with a transition metal sulfate so as to be charged with transition metal ions.

8. A process according to claim 7, in which the transition metal sulfate is ferric sulfate.

References Cited by the Examiner
FOREIGN PATENTS
13,654   1886   Great Britain.

OTHER REFERENCES
Mellor's "A Comprehensive Treatise on Inorganic and Theoretical Chem.," volume 5, 1924 edition, page 344, Longmans, Green & Co., New York.

MAURICE A. BRINDISI, Primary Examiner.